UNITED STATES PATENT OFFICE 2,226,054

COLORED CONDENSATION PRODUCTS AND PROCESS OF MAKING SAME

Friedrich Felix and Rudolf Ruegg, Basel, Switzerland, assignors to the firm Society of Chemical Industry in Basle, Basel, Switzerland No Drawing. Application May 9, 1939, Serial No. 272,728. In Switzerland May 12, 1938

2 Claims. (Cl. 260—465)

It is known that compounds which contain reactive methyl or methylene groups, for instance pyrazolones, dioxyquinolines, barbituric acids, sulfazones, sulfone acetonitriles, methylindoles, diketohydrindens, dihydroresorcinols, benzylcyanide, cyanoacetic acid, cyanoacetic acid esters, cyanoacetophenones or the like can react with aromatic aldehydes and ketones with formation of colored products.

It has now been found that the compounds of the general formula $$R_1=CH—R_2—X—COOH$$

wherein $R_1$ stands for the radical of an organic compound linked to the CH-group by means of a double bond which has been formed by condensation of a reactive methylene group with the O-atom of a carbonyl compound, $R_2$ stands for an aromatic mono-nuclear radical of the benzene series, and X stands for an aliphatic radical having at least two carbon atoms, are yellow powders which in the form of their alkali-metal salts or ammonia salts dissolve in water to yellow solutions and dye esters and ethers of cellulose similar tints from aqueous media.

Such compounds can be obtained by treating the condensation products of the general formula $$R_1=CH—R_2—V$$

wherein $R_1$ and $R_2$ have the above given signification and V represents a grouping whose constitution permits the introduction of organic radicals, that is to say a grouping which may contain for example mobile halogen atoms or hydroxyl groups, with agents which prevent the introduction of a carboxylic acid group.

It is appropriate to proceed in such a manner that for example products of the formula

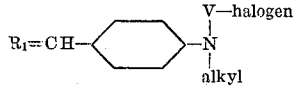

wherein $R_1$ has the above signification and V stands for an aliphatic radical consisting of at least two carbon atoms, are caused to react with alkali cyanides, and then converting the cyanogen group into the carboxylic acid group by treating it with saponifying agents. The products obtained by reacting compounds of the general formula

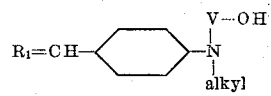

wherein $R_1$ and V have the aforesaid signification, with polybasic compounds, especially compounds selected from the group consisting of dibasic organic carboxylic acids and their anhydrides, esters and halides, have similar properties. One can arrive therefore quite generally at these compounds by condensing an alkyl-hydroxyalkyl-para-aminobenzaldehyde with an organic compound which contains a reactive methylene group or a methyl group and subsequently esterifying the hydroxyl group by treatment of the compound with a polybasic carboxylic acid, an acid ester being formed. The aldehydes mentioned above may contain the aliphatic radical united by means of a grouping other than a grouping which contains a nitrogen atom. Compounds of the formula

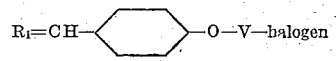

or

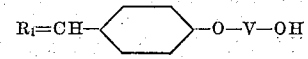

($R_1$ and V having the signification indicated above) may therefore also come into question. Among the organic compounds having reactive methyl or methylene groups named in the introduction, may be instanced especially the products of the pyrazolone series, for example 3-methyl-5-pyrazolone, phenylmethylpyrazolones and their products substituted in the phenyl radical, for example ortho-chlorophenylmethylpyrazolone, ortho-methylphenylmethylpyrazolone. Then there also come especially into question the condensation products from alkyl and aryl sulfone aceto-nitriles with alkyl-hydroxyalkylaminobenzaldehydes. Such compounds are obtainable for example by condensation of ethylsulfone acetonitrile or phenylsulfone acetonitrile with (N-ethyl-hydroxyethyl)-para-aminobenzaldehyde, of parachlorophenylsulfone acetonitrile with the aforesaid aldehyde or of phenylsulfone acetonitrile with (N-methyl-hydroxyethyl)-para-aminobenzaldehyde or (N-butyl-hydroxyethyl)-para-aminobenzaldehyde. Instead of the sulfone acetonitriles the esters, amides and arylides of cyanacetic acid may be used, for instance cyanacetic acid ethyl ester, cyanacetic acid amide, cyanacetic acid dimethyl or diethylamide. These compounds may be condensed with one of the aforesaid aldehydes or with a nitroso compound. Further dioxyquinoline, quinaldine or the like may be caused to react with the said aldehydes and also those compounds which have a reactive methyl group, for instance dinitrotoluene, acetophenone, substituted acetophenones, benzyl cyanide, nitromethane, malonic nitrile or the like. All these condensation products are then to be treated with a polybasic carboxylic acid or derivatives thereof, for instance an ester or an anhydride. Suitable polybasic organic acids include dicarboxylic acids and also sulfocarboxylic acids, for example, malonic acid, succinic acid, glutaric acid, adipic acid, pimelic acid, suberic acid or the like; also unsaturated acids, for instance fumaric acid, maleic acid, phthalic acid, naphthalic acid, as well as their sulfonic acids. One may treat the aldehyde which contains an alkyl radical having a hydroxyl group as a substituent with the polybasic acid; but advantageously the finished condensation product is selected for the reaction. For this purpose the intermediate product or condensation product to be esterified may be heated directly with the said acid. Alternatively where this is possible there is selected a derivative of the acid which is easily esterified, for example anhydride, halides or esters from aliphatic alcohols of low molecular weight. Reaction may occur in the presence of a solvent.

Dyestuffs obtainable by the invention form salts with metals and in this form, especially if in the form of an alkali-metal salt or an ammonium salt, are soluble in water. Various textiles may be dyed with these dyestuffs such as wool, silk and cotton, but especially acetate artificial silk, the tints being green-yellow and yellow. Among these dyestuffs some have good affinity for acetate artificial silk, especially when the dyeing is conducted in the presence of a weak alkali and if desired another electrolyte. Frequently the carboxylic acid group which determines solubility is so loosely bound to the aliphatic radical or the radical carrying this group is so loosely bound to the other constituent of the molecule that already during the dyeing there is a partial elimination of the radical to which the solubility is due. In this case the dyestuff separates in an extraordinarily finely dispersed form so that a colloid solution is obtained. From this solution the dyestuff is absorbed easily and uniformly by the material to be dyed.

The following examples illustrate the invention, the parts being by weight:

*Example 1*

5 parts of the dyestuff obtained by condensing (N - ethyl - hydroxyethyl) -para-aminobenzaldehyde with phenyl-sulfone acetonitrile are introduced at about 100° C. into 5 parts of molten maleic acid anhydride. When a test portion proves soluble in ammoniacal water, the fused mass is introduced into water, neutralized with an alkali, for instance ammonia and dissolved by heating. By addition of a salt the dyestuff may be precipitated. It may also be obtained by grinding the fused mass with a calculated proportion of calcined sodium carbonate. When isolated and dried the dyestuff of the formula

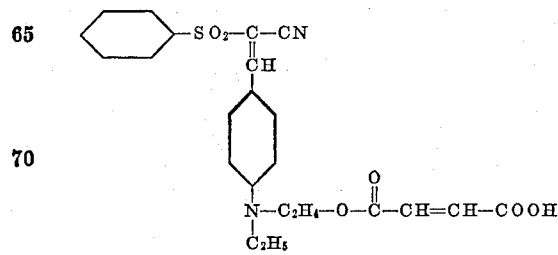

is a bright yellow powder soluble in pure water to a greenisth yellow solution and dyeing acetate artificial silk the same tint. Instead of the phenylsulfone acetonitrile there may also be used alkylsulfone acetonitrile, for example ethylsulfone acetonitrile or butylsulfone acetonitrile. Further there may be used other products having reactive methylene or methyl groups, for example acetophenone, malonic nitrile, benzyl cyanide, dinitritoluene, and the like. Instead of the above aldehyde there may be used in all cases (N-butyl-hydroxyethyl)-para-aminobenzaldehyde. Further there may also be used an aldehyde of different composition, for example an aldehyde containing a nitro-group or halogen atoms, that is to say aldehydes of the formulas

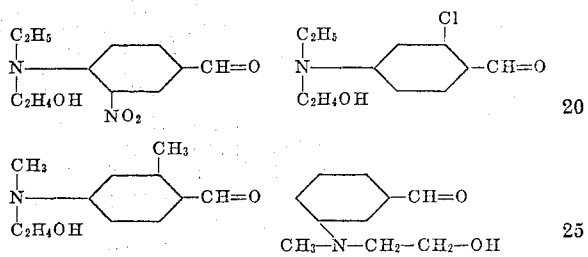

further also aldehydes containing more than one hydroxyl group, for example an aldehyde of the formula

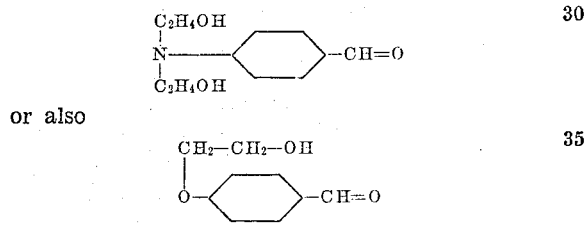

or also

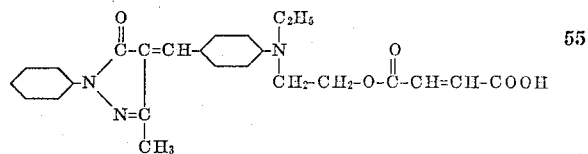

The procedure is similar when using other polybasic acids, it being possible to reduce the proportion thereof. It is also possible to operate in a solvent, for example pyridine or a hydrocarbon.

*Example 2*

Equal parts of the dyestuff obtainable by condensation of 1-phenylmethyl-3-methyl-5-pyrazolone with (N-ethyl-hydroxy-ethyl)-para-aminobenzaldehyde and maleic acid anhydride are heated together at a temperature of 90–100° C. After the esterification is complete the mass is introduced into water, neutralized preferably with ammonia and the dyestuff of the formula

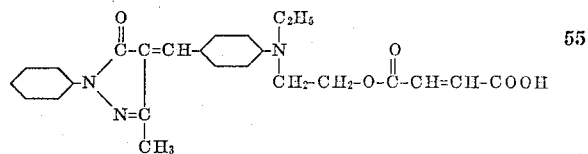

is salted out and isolated. After drying it is a dark yellow powder soluble in water to a yellow solution and dyeing acetate artificial silk in a like tint.

If instead of the maleic acid anhydride the anhydride of phthalic acid is used, there is obtained a dyestuff of the formula

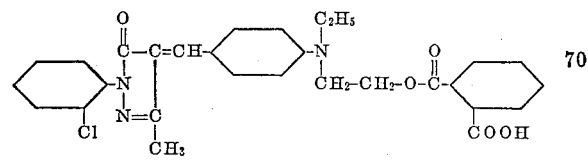

when using 1-(ortho-chloro)-phenyl-3-methyl- 5-pyrazolones. Aldehydes containing the carboxylic acid group linked directly to an alkyl radical may also be used. In such a case there are obtained for example compounds of the following formula

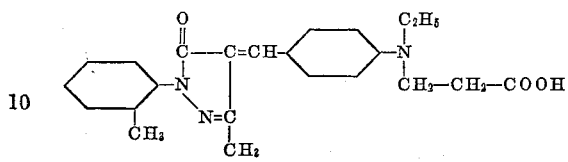

The procedure is the same when a substituted pyrazolone, for instance a pyrazolone halogenated in the nucleus, is used.

*Example 3*

0.5 part of the dyestuff obtained as described in Example 1 (first sentence) is dissolved in 3000 parts of water. To the dye-bath there are added 40 parts of crystallized sodium sulfate and in this bath 100 parts of acetate silk yarn are treated for one hour at 80° C. After rinsing and drying there is obtained an acetate artificial silk which is dyed pure greenish yellow.

This dyestuff may be also dyed in a short liquor, for example in the jigger, for which purpose, in consequence of its good solubility and its good affinity, it is especially suitable.

What we claim is:
1. The colored water-soluble condensation products of the general formula

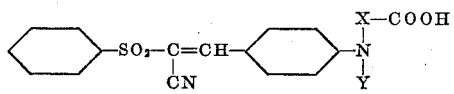

wherein X stands for the

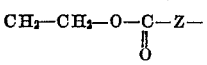

group, Z representing a carbon bridge consisting of at least two carbon atoms, and Y stands for an alkyl radical, which products are yellow powders which in the form of their alkali-metal salts and ammonium salts dissolve in water to yellow solutions and dye esters and ethers of cellulose yellow tints from aqueous media.

2. The colored water-soluble condensation product of the formula

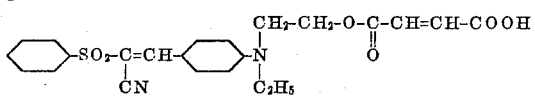

which product is a yellow powder which in the form of its alkali-metal salts and ammonium salts dissolves in water to yellow solutions and dyes esters and ethers of cellulose yellow tints from aqueous media.

FRIEDRICH FELIX.
RUDOLF RUEGG.